(12) United States Patent
Buls et al.

(10) Patent No.: US 6,568,734 B2
(45) Date of Patent: May 27, 2003

(54) STRAIGHT MOTION PARALLELOGRAM LINKAGE

(75) Inventors: Vincent Buls, Wilton, IA (US); Stacy Hanser, Davenport, IA (US)

(73) Assignee: HWH Corporation, Moscow, IA (US)

( * ) Notice: Subject to any disclaimer, the term of this patent is extended or adjusted under 35 U.S.C. 154(b) by 0 days.

(21) Appl. No.: 09/682,874

(22) Filed: Oct. 26, 2001

(65) Prior Publication Data

US 2003/0080576 A1 May 1, 2003

(51) Int. Cl.[7] .................................................. B60P 3/34
(52) U.S. Cl. ............................... 296/26.12; 296/26.13; 296/172; 296/173; 296/176; 296/165
(58) Field of Search ............................ 296/26.13, 26.12, 296/26.01, 171, 172, 173, 175, 176, 165

(56) References Cited

U.S. PATENT DOCUMENTS

| | | | | |
|---|---|---|---|---|
| 3,582,130 A | * | 6/1971 | Borskey | 296/176 |
| 3,619,001 A | * | 11/1971 | Borskey | 296/176 |
| 3,924,889 A | * | 12/1975 | Gogush | 296/176 |
| 4,981,319 A | * | 1/1991 | Gerzeny et al. | 296/165 |
| 5,078,441 A | * | 1/1992 | Borskey | 296/165 |
| 5,366,266 A | * | 11/1994 | Harbison | 296/165 |
| 5,857,733 A | * | 1/1999 | Dewald, Jr. et al. | 296/175 |
| 6,125,520 A | * | 11/2000 | Gardner | 296/175 |
| 6,325,437 B2 | * | 12/2001 | Hiebert et al. | 296/26.01 |

* cited by examiner

Primary Examiner—D. Glenn Dayoan
Assistant Examiner—H. Gutman
(74) Attorney, Agent, or Firm—James C. Nemmers

(57) ABSTRACT

A linkage mechanism provides for the extension and retraction of rooms in recreational vehicles while maximizing the space inside the vehicle. Braced parallel linkage members are applied between a vehicle frame member and an expandable room member. A hydraulic cylinder or other force assist element may be used to drive a slotted glide arm which, in turn, causes the braced parallelogram linkage to shift, thus pulling or pushing the room frame member relative to the vehicle.

4 Claims, 5 Drawing Sheets

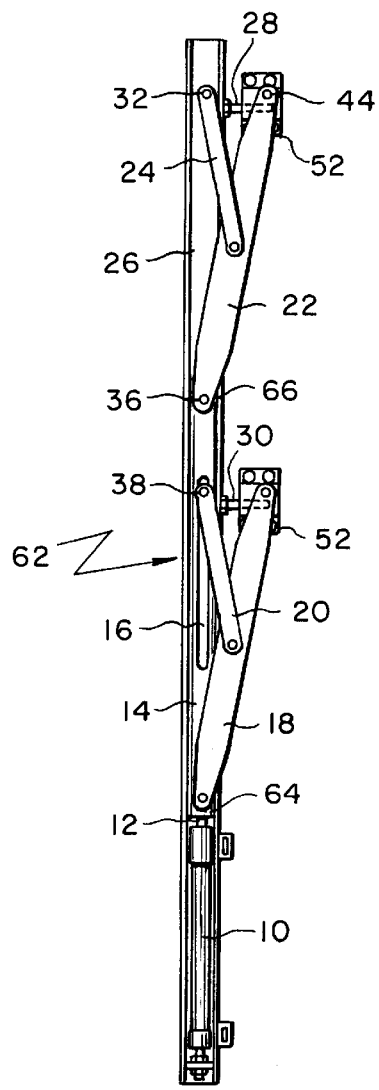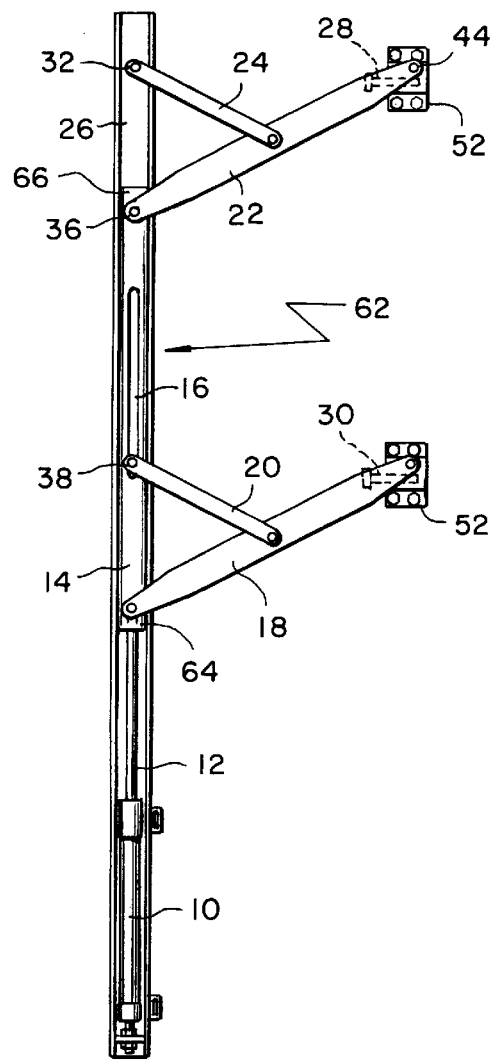
FIG. 1
FIG. 2

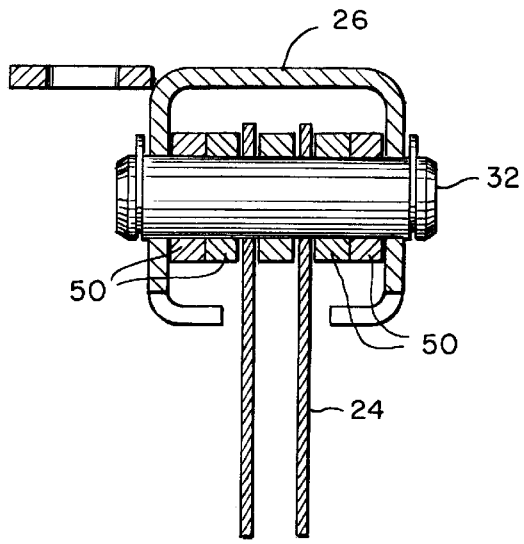
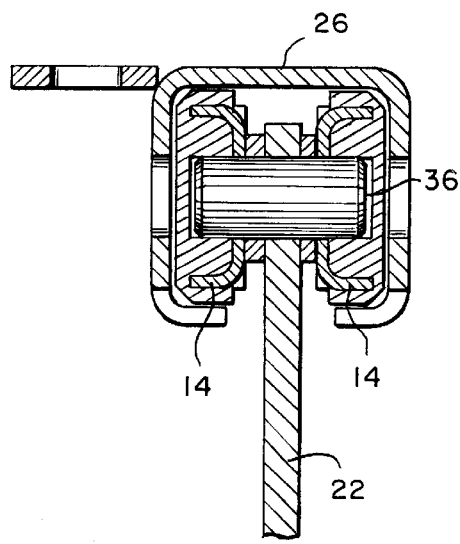
FIG. 5      FIG. 6
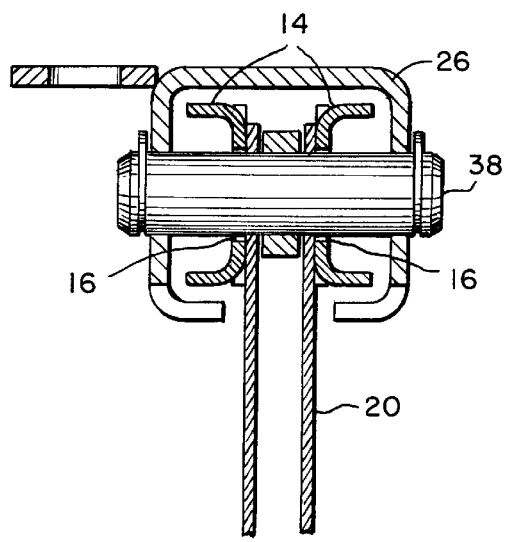
FIG. 7

STRAIGHT MOTION PARALLELOGRAM LINKAGE

BACKGROUND OF INVENTION

The invention relates to a braced parallelogram linkage for moving members together or apart in a substantially linear motion without a substantial shift in a direction perpendicular to the desired linear motion. Typical parallelogram linkages that are commonly used for a variety of purposes involve a pair of parallel members attached pivotally to a pair of parallel linkage members. If one of the parallel members is fixed, then motion of the parallelogram linkage results in an angular motion—in or out and up or down rather than simply in or out. The present invention relates to a generally straight motion parallelogram linkage.

The invention disclosed herein is particularly useful as a control mechanism for expandable rooms in habitable structures, especially room structures that are telescopically slideable between retracted and extended positions for motorized or towed vehicles. A variety of vehicles are known and used that have a room or a room portion that may be moved from a retracted position while the vehicle is moving over the road to an extended position when the vehicle is stationary in order to provide additional internal space. This type of an arrangement provides adequate space to accommodate users when a recreational vehicle is parked for habitation while still keeping the vehicle within governmental regulations that impose width limitations for vehicles on roads and highways. When these vehicles are stationary, they are frequently used for habitation for extended periods of time, and when so used, it is highly desirable to be able to maximize the available living space. This is done in a variety of ways in which the user can move a "nested" portion of the expandable room out to its extended or expanded position, typically under hydraulic or electrical power.

These expandable room portions usually comprise a structure that includes a floor, a roof, an external side wall (typically generally parallel to the vehicle side wall), an open (or openable), interior side wall, and one or more end walls (typically generally perpendicular to the vehicle side wall). These components are typically made of frame members and wall panels. In the retracted position, the roof, floor and end walls are typically concealed from exterior view and the room exterior side wall forms a portion of the vehicle side wall. A large factor in the purchase of a vehicle of this type is the amount of space that is available inside the vehicle. Thus, it is desirable that the mechanism for extending and retracting the room occupy a minimum amount of space within the vehicle.

The prior art for expanding and retracting expandable rooms generally employs hydraulic arms that are housed inside the vehicle or under the floor of the vehicle. The hydraulic arms housed inside the vehicle require a housing unit when they are in their retracted position. This housing unit remains intact when the room is extended taking up space within the vehicle.

The hydraulic arms that are housed under the floor are generally complex, relatively expensive, and may be unduly heavy. The additional weight also adversely affects the fuel economy of the vehicle. With the highly competitive market in these recreational vehicles, cost and reliability of operation are important factors. Further, when the room is in the retracted position, otherwise available storage space under the floor is lost.

It is therefore an object of the invention to provide an improved mechanism for expandable rooms for vehicles that is relatively inexpensive to manufacture, reliable in use, lightweight, and which will allow for maximum space inside the vehicle. It is a further object to provide a braced parallelogram linkage that permits motion of members together or away from one another in a substantially linear path without substantial movement of said members in a direction perpendicular to said path. It is a further object to provide a mechanism for the expansion and retraction of expandable rooms or structures when the rooms or structures are not disposed for convenient housing of the mechanism in the floor. Finally, it is an object of the present invention to provide such a parallelogram linkage mechanism wherein a force assist means such as, for example, a hydraulic cylinder, electric drive, or pneumatic control system may drive the movement of the braced parallelogram linkage.

SUMMARY OF INVENTION

The present invention includes an extension assembly for manual operation or having a hydraulic cylinder or other force assist such as a pneumatic control system, electric drive or other similar system, mounted to effect the coordinated movement of braced parallelogram linkage members through the actuation of a glide arm or rolling support arm. The glide arm or rolling support arm preferably moves generally along a first structural member such as a vehicle frame member as the hydraulic cylinder rod extends or retracts relative to the cylinder body or as manual operation moves structural members relative to one another. The glide arm is pivotally connected to the exterior ends of braced parallelogram linkage members that extend to points of pivotal attachment with a second structural member, such as expandable room members. The glide arm has an opening formed therein to accommodate movement of the glide arm about a bracing member that is pivotally attached to the first structural member such as vehicle frame member.

The braced parallelogram linkage members comprise a first parallel linkage member that is braced by a first parallel linkage bracing member, and a second parallel linkage member that is braced by a second parallel linkage bracing member. The parallel linkage bracing members are pivotally attached to the respective parallel linkage members and they are also attached to the first structural member. In this manner, movement of the glide arm or rolling support arm causes the exterior ends of the parallel linkage members to move and pivot thus extending or retracting the room and changing the relative angles between the parallel linkage members and the parallel linkage bracing members, the parallel linkage members and the first structural member, and the parallel linkage members and the second structural member, respectively.

BRIEF DESCRIPTION OF DRAWINGS

FIG. 1 is a side elevation view of the extension assembly in the retracted position that accompanies an expanded room.

FIG. 2 is a side elevation view of the extension assembly in the extended position that accompanies a retracted room.

FIG. 5 is a top, cross-sectional view of the pivotal connection of the vehicle frame member and the second parallel linkage-bracing member.

FIG. 6 is a top cross-sectional view of the pivotal connection of the second parallel linkage member to the gliding support arm within the vehicle frame member.

FIG. 7 is a top cross-sectional view of the vehicle frame member showing the pivotal mounting of the first parallel linkage bracing member to the frame member through the slot of the gliding support arm.

DETAILED DESCRIPTION

Figure 10:
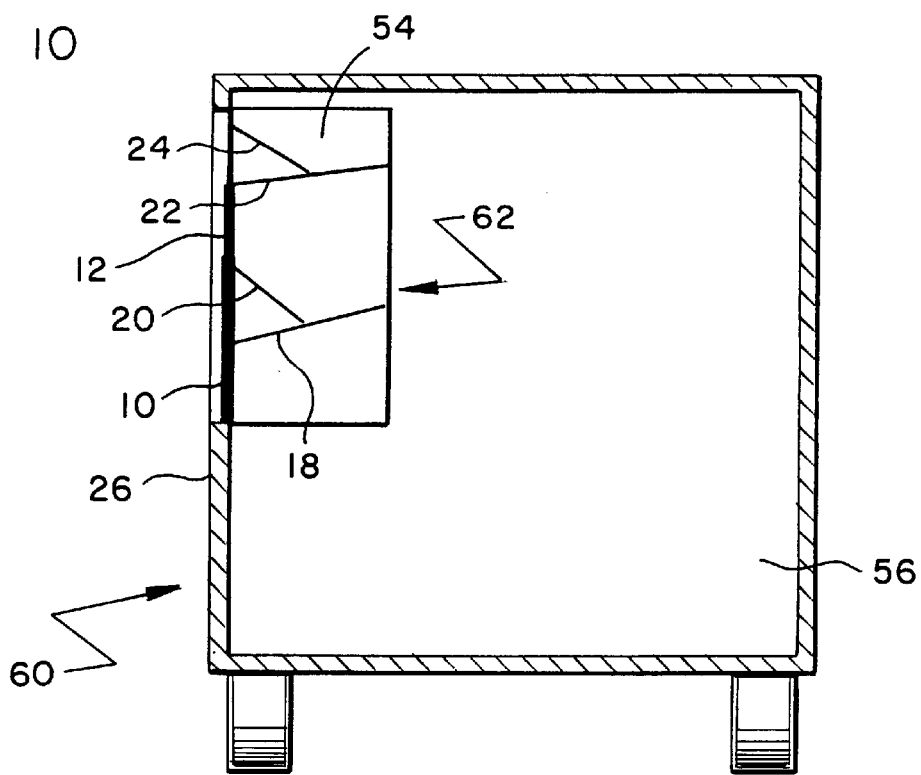
FIG. 10 is an interior end view of a coach having an expandable room wherein the room is retracted and the parallelogram linkage is extended.
Figure 11:
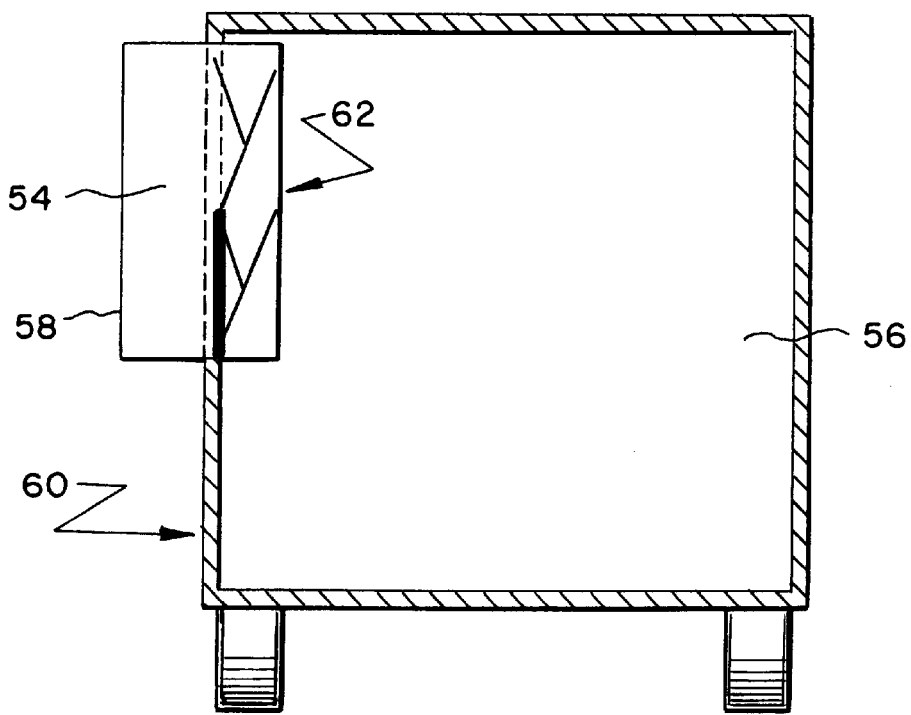
FIG. 11 is an interior end view of a coach having an expandable room wherein the room is extended and the parallelogram linkage is retracted.

Referring first to FIGS. 10 and 11, there is illustrated a motor vehicle such as a recreational vehicle 56 that has extending from an opening in its side wall an expandable room or room structure indicated generally by the reference numeral 54. In FIGS. 10 and 11 the expandable room shown is raised and serves as wardrobe or cupboard space. Of course, rooms of various sizes may be used. FIG. 11 shows the expandable room in its extended position to provide additional living or storage space inside the recreational vehicle when the vehicle is stationary, such as at a campsite. As is well known to those skilled in the art, when the vehicle is traveling over the road, the expandable room 54 is retracted as shown in FIG. 10 so that the side wall 58 of the expandable room 54 is generally flush with an exterior wall 60 of the recreational vehicle 56.

FIGS. 1 and 2 show the extension assembly (62 overall) for extending and retracting the raised room. FIG. 1 shows the extension assembly in the retracted position (extended room position) while FIG. 2 shows the extension assembly in the extended position (retracted room position). A glide support arm 14 is housed generally within or along a first frame member 26 such as a frame member of a vehicle. A braced parallelogram linkage comprising first and second parallel linkage members 18, 22 and first and second parallel linkage bracing members 20, 24 is shown. The first and second parallel linkage members 18, 22 are pivotally mounted to a second frame member such as an expandable room frame member expandable room on expandable room members located within the recreational vehicle 56. As the braced parallelogram linkage moves from its extended position to its retracted position, towards the vehicle side wall 60 the expandable room portion is pulled from within the recreational vehicle 56 to extend outwardly from the recreational vehicle 56 when the braced parallelogram linkage is in its retracted position. Of course, the attachment could be reversed to mount the hydraulic cylinder along the expandable room exterior side wall in which case the mechanism would push the room outwardly and pull the room inwardly. Mounting the mechanism to a vehicle frame member is preferred for preserving space.

Figure 4:
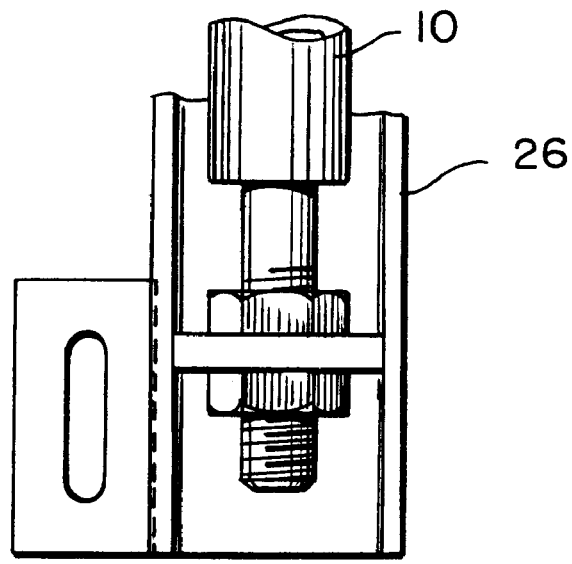
FIG. 4 is a side view of the hydraulic cylinder attachment to a vehicle frame member.

A hydraulic cylinder 10 having a hydraulic cylinder rod 12 extendable therefrom is attached to the vehicle frame 26 as shown in FIG. 4. The hydraulic cylinder rod 12 has an outer end attached to a first end 64 of the glide arm 14. The glide arm 14 has a longitudinal opening or slot 16 formed therein between the glide arm first end 64 and second end 66. The first parallel linkage member 18 is pivotally combined with and extends between the glide arm 14 and a second frame member mount or room mount 52. The second parallel linkage member 22 is pivotally combined with and extends between the glide arm second end 66 and a room mount 52. In this manner, the glide arm 14 and the ends of the attached parallel linkage members 18, 22 may move generally along the first frame member 26 as the hydraulic cylinder rod 12 is extended or retracted.

First and second parallel linkage bracing members 20, 24 are pivotally combined with the first frame member 26 and with the first and second parallel linkage members 18, 22, respectively. In this manner, the motion of the pivotally mounted parallel linkage members 18, 22 is constrained by the bracing members 20, 24. In the preferred arrangement, the second parallel linkage bracing member 24 is pivotally mounted to the frame member 26 at a location beyond the range of motion of the glide arm 14. The first parallel linkage bracing member 20 is pivotally mounted to the frame member 6 at a location within the path of the slot or opening 16 formed in the glide arm 14. In this manner, the attachments of the parallel linkage bracing members 20, 24 to the first frame member 26 do not interfere with the movement of the glide arm 14.

There are preferably provided stop pins 28, 30 mounted to extend outwardly from the room mount 52 to provide a defined stopping point and to prevent over-extension of the room.

Figure 3:
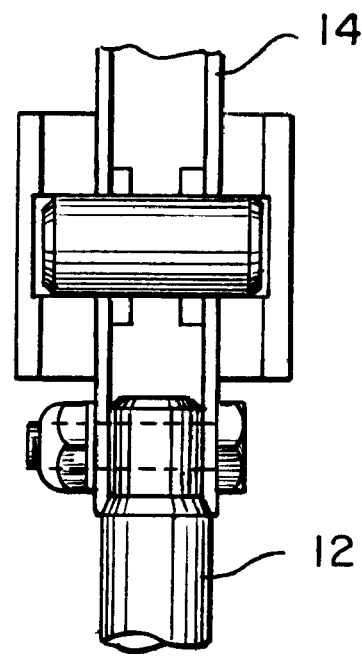
FIG. 3 is a side view of the hydraulic cylinder rod attachment to the gliding support arm.

As disclosed in FIG. 3, the hydraulic cylinder rod 12 is attached to the glide support arm 14 to force the glide support arm 14 to move generally along the frame member 26. FIG. 5 illustrates the pivotal connection of the second parallel linkage bracing member 24 and the first frame member 26 via a second parallel linkage bracing member pin connector 32 having bearings 50 mounted thereon to minimize lateral movement of the second parallel linkage bracing member 24 upon its pin connector 32. FIG. 6 illustrates the pivotal connection of the second parallel linkage member 22 to the glide arm 14 via a second parallel linkage member pin connector 36.

The glide arm 14 is shown to be nested and slidable within the first frame member 26. Of course, depending on glide arm 14 or first frame member 26 configuration, the glide arm 14 may be disposed in any convenient arrangement to move generally along the frame member 26. FIG. 7 illustrates the pivotal connection of the first parallel linkage bracing member 20 and the first frame member 26 via a pin connector 38 that is anchored to the first frame member 26 and disposed within the slot or opening 16 formed in the glide arm 14 to allow the glide arm 14 to slide within the frame member 26 about the first parallel linkage bracing member pin connector 38.

Figure 8:
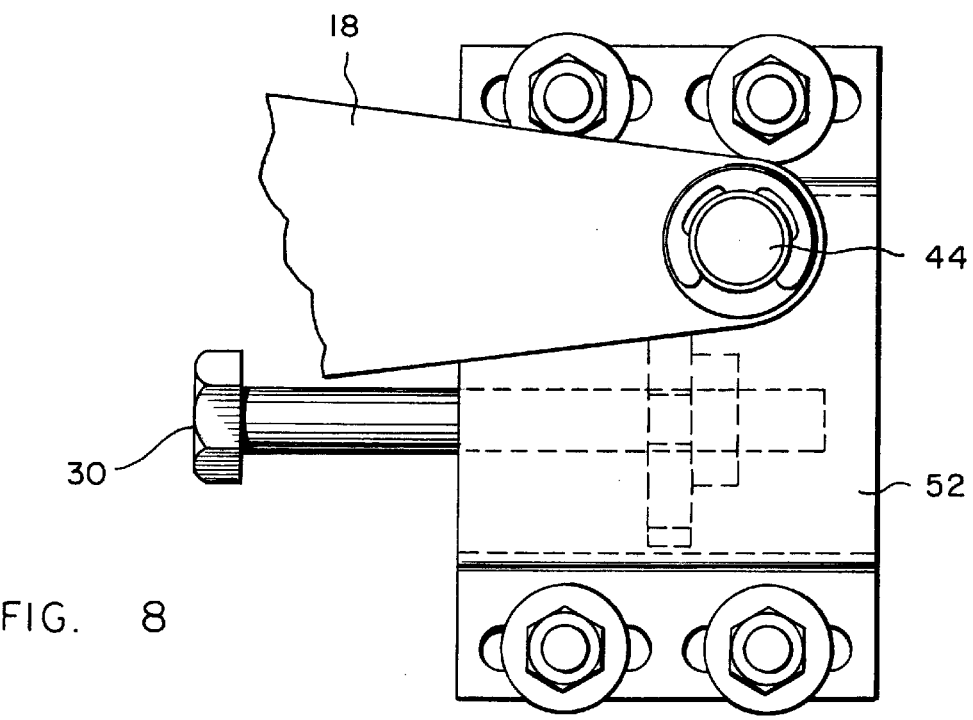
FIG. 8 is a vehicle interior side view of the first parallel linkage member pivotal attachment to a room mount.
Figure 9:
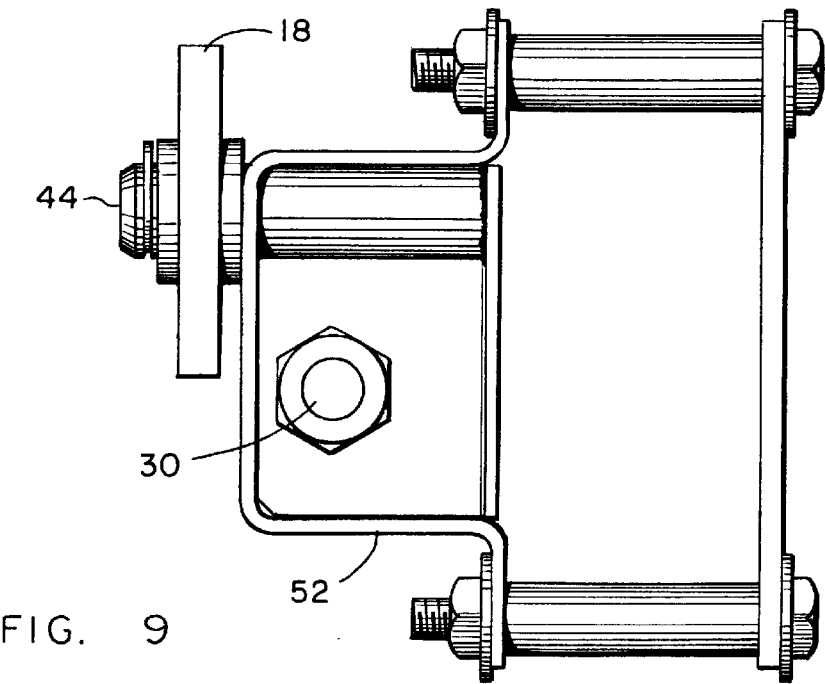
FIG. 9 is an end view of the first parallel linkage member pivotal attachment to an expandable room mount.

FIGS. 8 and 9 illustrate the pivotal connection of the room mount 52 and the first parallel linkage member 18. The first parallel linkage member 18 is pivotal about a first room mount pin connector 44. The room mount 52 includes a stop pin 30 to control extension of the room or structure 54.

Although the preferred embodiment as described herein includes reference to a force assist element, the present invention is intended for use with a manual force assist element or with no force assist element. Without a force assist element, the room may be manually pushed or pulled and it is preferred to employ room locks to secure the room in the extended or retracted position.

Having described the invention in reference to the preferred embodiment thereof, it will be understood by those skilled in the relevant art that various modifications and revisions may be made and that such modifications and revisions are intended to be within the scope of the invention as claimed below.

What is claimed is:

1. A system for laterally moving a first member relative to a second, generally parallel member without substantially moving the first member relative to the second member in a direction transverse to the direction of lateral movement, the system comprising:

the first member having a longitudinal axis;

the second member having a longitudinal axis that is disposed generally parallel to the longitudinal axis of the first member;

a glide arm moveably disposed in combination with the first member to be selectively moveable generally along the longitudinal axis of the first member, the glide arm having an elongated opening formed therein;

a first parallel linkage member being pivotally combined with the glide arm and the second member;

a second parallel linkage member being disposed generally parallel to the first parallel linkage member and being pivotally combined with the glide arm and the second member;

a first parallel linkage bracing member being pivotally attached to the first member through the elongated opening in the glide arm and extending to be pivotally combined with the first parallel linkage member intermediate the glide arm and the second member; and a second parallel linkage bracing member disposed generally parallel to the first parallel linkage bracing member and being pivotally combined with the first member and extending to be pivotally combined with the second parallel linkage member intermediate the glide arm and the second member.

2. A system for horizontally moving an expandable room structure between a retracted position within a vehicle and an extended position protruding outwardly from the vehicle without substantially moving the expandable room vertically relative to the vehicle, the system comprising:

a vehicle member;

an expandable room member disposed generally parallel to the vehicle member;

a glide arm moveably disposed in combination with the vehicle member to be selectively moveable generally along the vehicle member, the glide arm having an elongated opening formed therein;

a force assist means combined with the vehicle and the glide arm for extending and retracting the glide arm generally along the vehicle member;

a first parallel linkage member being pivotally combined with the glide arm and the expandable room member;

a second parallel linkage member being disposed generally parallel to the first parallel linkage member and being pivotally combined with the glide arm and the expandable room member;

a first parallel linkage bracing member being pivotally attached to the vehicle member through the elongated opening and extending to be pivotally combined with the first parallel linkage member intermediate the glide arm and the expandable room member; and a second parallel linkage bracing member disposed generally parallel to the first parallel linkage bracing member and being pivotally combined with the vehicle member and extending to be pivotally combined with the second parallel linkage member intermediate the glide arm and the expandable room member.

3. The system of claim 2 wherein:

the second parallel linkage bracing member is pivotally attached to the vehicle member at a location beyond the range of motion of the glide arm.

4. A system for horizontally moving an expandable room structure between a retracted position within a vehicle and an extended position protruding outwardly from the vehicle without substantially moving the expandable room vertically relative to the vehicle, the system comprising:

a vehicle member;

an expandable room member disposed generally parallel to the vehicle member;

a glide arm moveably disposed in combination with the vehicle member to be selectively moveable generally along the vehicle member;

a force assist means combined with the vehicle and the glide arm for extending and retracting the glide arm generally along the vehicle member;

a first parallel linkage member being pivotally combined with the glide arm and the expandable room member;

a second parallel linkage member being disposed generally parallel to the first parallel linkage member and being pivotally combined with the glide arm and the expandable room member;

the first and second parallel linkage members being attached respectively to a first and second expandable room mount, each of the mounts having a stop pin extending therefrom towards the vehicle member to limit the motion of the vehicle member relative to the expandable room member;

a first parallel linkage bracing member being pivotally combined with the vehicle member and extending to be pivotally combined with the first parallel linkage member intermediate the glide arm and the expandable room member; and a second parallel linkage bracing member disposed generally parallel to the first parallel linkage bracing member and being pivotally combined with the vehicle member and extending to be pivotally combined with the second parallel linkage member intermediate the glide arm and the expandable room member.

* * * * *